Sept. 5, 1950 G. M. HUHEEY ET AL 2,521,458
DISPENSING MACHINE
Filed March 20, 1948 2 Sheets-Sheet 1

INVENTORS
George M. Huheey
William J. Whitacre
BY
Murray, Sackhoff & Paddack
ATT'YS Sept. 5, 1950     G. M. HUHEEY ET AL     2,521,458
DISPENSING MACHINE
Filed March 20, 1948     2 Sheets-Sheet 2

INVENTORS
George M. Huheey
William J. Whitacre
BY
Murray, Sachkoff & Paddock
ATT'YS Patented Sept. 5, 1950

2,521,458

UNITED STATES PATENT OFFICE 2,521,458

DISPENSING MACHINE

George M. Huheey and William J. Whitacre, Cincinnati, Ohio, assignors to Porter Castleberry, Cincinnati, Ohio Application March 20, 1948, Serial No. 16,066

8 Claims. (Cl. 312—63)

This invention relates to dispensing machines of the cabinet type and has for its principal object the provision of a novel dispensing mechanism for milk cartons that has an inclined article chute rockably mounted within the cabinet which cooperates with a unique dispensing receptacle mounted for oscillating movement in the cabinet wall to secure improved article dispensing functions for this type of machine.

Another object of the invention is to provide an oscillating dispensing receptacle which, during dispensing movement, moves the lower end of a rockable, inclined article chute to a position above the cabinet opening, uncovered by operation of said receptacle, to preclude unauthorized tampering with the contents of the machine and especially preventing access to the lowermost article in the chute.

A further object of the invention is to provide a dispensing unit which has a positive dispensing action and wherein the articles to be dispensed will readily move from the inclined feed chute to the dispensing receptacle without stoppage, wedging or sticking in the chute itself or between the chute and dispensing receptacle.

A still further object of the invention is to provide in a dispensing machine of the refrigerated cabinet type a simplified mechanism which can be removed as a unit from the cabinet for cleaning, repairs or replacement purposes.

Other objects and practical advantages of the invention will be fully understood from the following specification and claims when read in connection with the drawings.

In the drawings wherein like reference numerals indicate similar parts:

Figure 1:
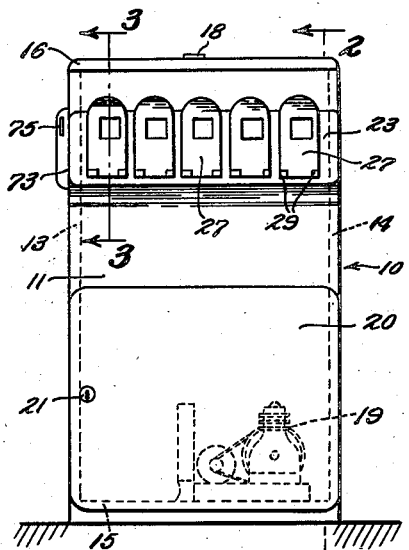
Fig. 1 is a front elevational view of our dispensing machine.
Figure 2:
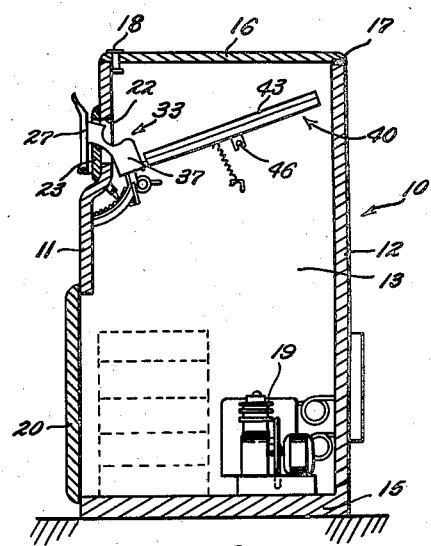
Fig. 2 is a section taken on line 2—2 of Fig. 1.

Generally our improved dispensing device is adapted for coin controlled vending machines and is particularly useful in vending highly perishable liquid products such as milk, or the like, which is packaged in cartons.

The numeral 10 generally indicates a cabinet having a single compartment constructed with a front wall 11, a back wall 12, opposed side walls 13 and 14 and a bottom 15 all insulated in the usual manner and preferably having the insulation sheathed in thin metal walls. The cabinet has an insulated top 16 hinged to the back wall at 17 and held in closed position by a key controlled lock 18. A refrigerating unit 19 is mounted upon the bottom 15 of the cabinet and may be removed therefrom for repairs or replacement through a door 20 hinged to the front wall 11 and secured thereto by a key lock 21.

An elongated aperture 22 is formed in the front wall across the upper portion thereof, said aperture being closed by a plate 23 which is fixed to the wall by suitable bolts 24 (Fig. 3) threaded in integral lugs 25 formed on its interior surface. The plate has a number of transversely spaced, dispensing openings 26 formed therethrough and each of said openings has associated with it a manually operable closure 27 which is hinged at its lower end on a pin 28 which in turn is secured to the plate 23 by spaced hinge brackets 29. As will presently be understood selective manual operation of any one of the hinged closures dispenses an article, such as a carton of milk, which has been stored on an inclined article chute spaced in longitudinal alignment behind each closure.

The chutes and their respective dispensing receptacles are identical in structure and operation, and a description of one of them will be sufficient to clearly describe our invention. As clearly illustrated in Figs. 3 and 4 the closure 27 is provided at its upper end with a convex, hand grip portion 30 and has a centrally located opening 31 formed therethrough which is closed by a transparent plate 32 so that the article to be selected may be viewed from the exterior of the cabinet. An inclined, L-shaped dispensing receptacle or pocket 33 is fixed to the interior of the closure and has an inclined end wall 34 extending from an intermediate portion of the closure 27 through the lower part of the dispensing opening 26 with its extremity positioned well within the cabinet and substantially level with the closure pivot pin 28. The dispensing pocket also has an oppositely inclined bottom wall 35 that is fixed to the lower end of the inclined end wall 34 and is disposed normal thereto; said end and bottom walls being connected by upstanding lateral walls 36 and 37 which are provided at their upper ends with aligned hand openings 38. As is clearly illustrated in Fig. 3 the L-shaped receptacle extends through, and has circular movement in, the dispensing opening 26 and normally has its predominant portion within the cabinet and below the lower edge of said dispensing opening. A suitable seal 39 extends around the mounting side of the receptacle to effectively seal the dispensing opening 26 when the closure 27 is in the closed position indicated in Fig. 3.

Figure 6:
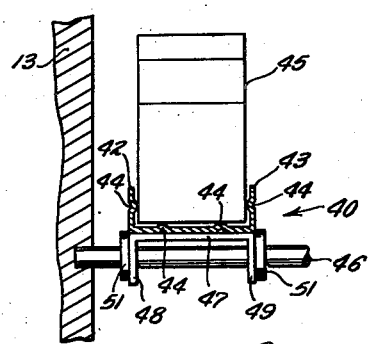
Fig. 6 is a section taken on line 6—6 of Fig. 4.
Figure 3:
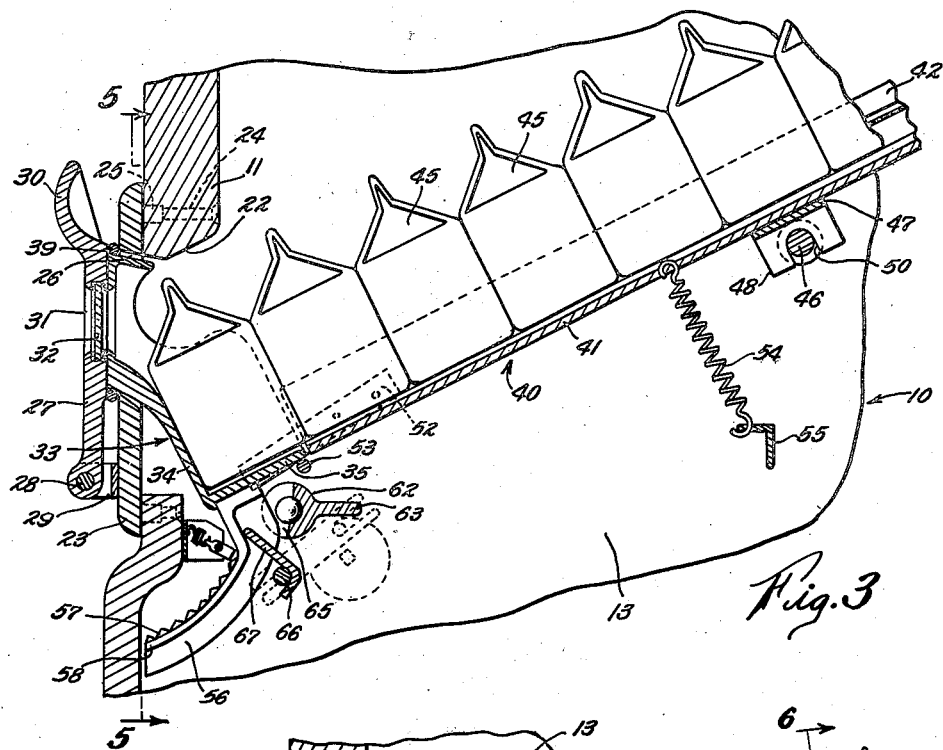
Fig. 3 is an enlarged section taken on line 3—3 of Fig. 1 showing the dispensing machine in inoperative position.
Figure 4:
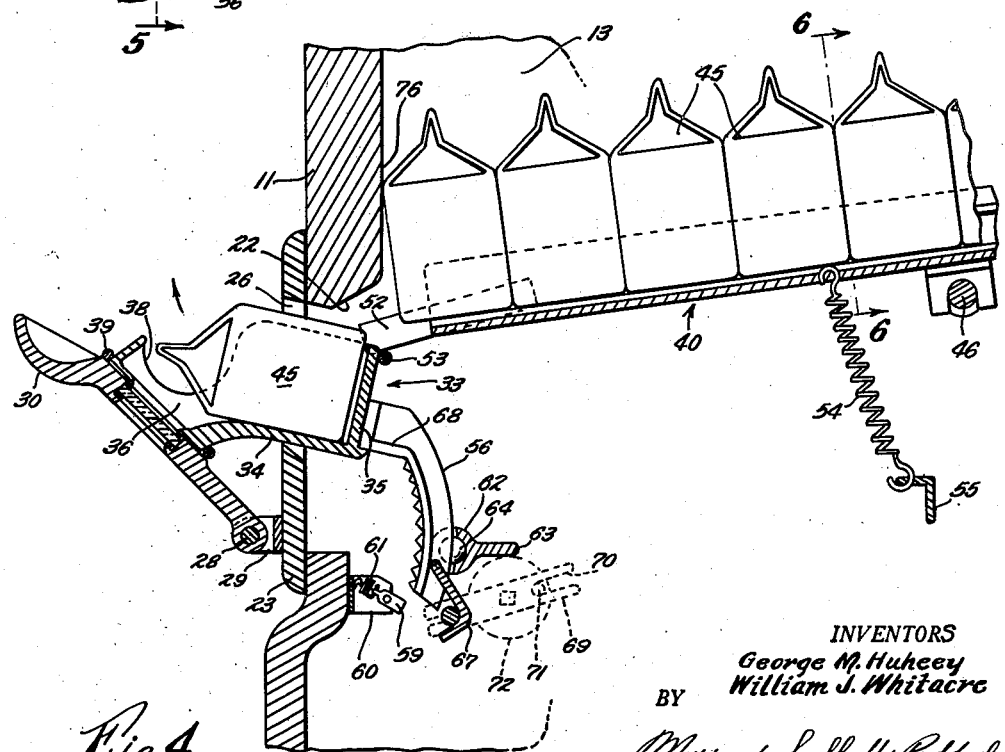
Fig. 4 is a view similar to Fig. 3 showing the machine parts in operative dispensing positions.

The dispensing receptacle cooperates in an improved and novel manner with an inclined feed chute 40 for storage of a number of articles to be dispensed by the receptacle. The chute is constructed from a rigid channel having a bottom 41 and opposed sides 42 and 43 (Fig. 6). The bottom and sides are provided with inturned, antifriction ribs 44 which are formed longitudinally in the channel and are adapted to engage at their inner ends with the bottom and side portions of the cartons 45 held for sliding movement on the chute. The channel is mounted for rocking movement intermediate its ends upon a cross shaft 46 which is suitably anchored at its ends in the side walls 13 and 14 of the cabinet and serves as a common rock shaft for all the article feed chutes contained in the cabinet. As illustrated in Figs. 3 and 6 the mounting means between the channel and the shaft 46 may take the form of an inverted U-shaped bar 47 having spaced, downturned ears 48 and 49 each of which are provided with laterally aligned, open slots 50 for receiving the cross-shaft 46. Each chute mounting is precluded from transverse movement by shoulders 51 fixed in spaced relation on the shaft 46.

The forward end of the chute is supported by a longitudinally extensible connection between the lower end of the chute and the adjacent inner end portion of its respective dispensing receptacle, said connection preferably taking the form of a pair of longitudinally extending, spaced arms 52—52 riveted or otherwise fastened to the sides 42—43 of the chute. These arms rest upon transversely extending pins 53—53 mounted on the underside of the bottom wall 35 for the receptacle. It will therefore be noted that upon oscillating movement of the dispensing receptacle about its pivot pin 28 the lower end of the chute 40 will be raised and lowered, thereby rocking the chute upon its mounting rod 46. The arms 52—52 on the chute are biased toward engagement with the pins 53—53 on the receptacle by a spring 54 which is hooked at its upper end to the bottom of the chute intermediate the rock shaft mounting and the associated receptacle and is secured at its lower end to a bar 55 extending across the interior of the cabinet and anchored at its ends to the side walls 13 and 14.

Each receptacle has a control bar which may comprise a depending arcuate arm 56 having an arcuate row of teeth 57 and an arcuate rib 58 extending transversely therefrom. The teeth of each control bar are adapted to engage with a pawl 59 pivoted on a U-shaped bracket 60 in turn mounted to the interior surface of the front wall 11 adjacent the control arm 56. The pawl is resiliently mounted in the path of the teeth by a spring 61 secured to the upper end of the bracket and it will be understood that after initial actuation of the dispensing receptacle in either direction of its operation said movement must be completed before the direction can be reversed.

The control bars of all the receptacles are engaged by a common ball lock-out means which comprises a tubular member 62 provided with a reenforcing fin 63. The member is anchored in the side walls 13 and 14 and has a number of metal balls 64 held therein with enough overall space between them to allow the admission of but a single arm 56 between them. The tubular member is disposed in the paths of the arms for all the receptacles and narrow slots 65 are formed in the forward side of the tubular member for the admission of the arm therein when the receptacle is moved from its inoperative, closed position. This structure prevents the operator from withdrawing more than a single dispensing member for each coin controlled operation of our machine for upon the entrance of one arm into its respective slot 65 in the tubular member 62 the balls in the tubular member are so crowded as to preclude the entrance of another receptacle arm therein.

Figure 5:
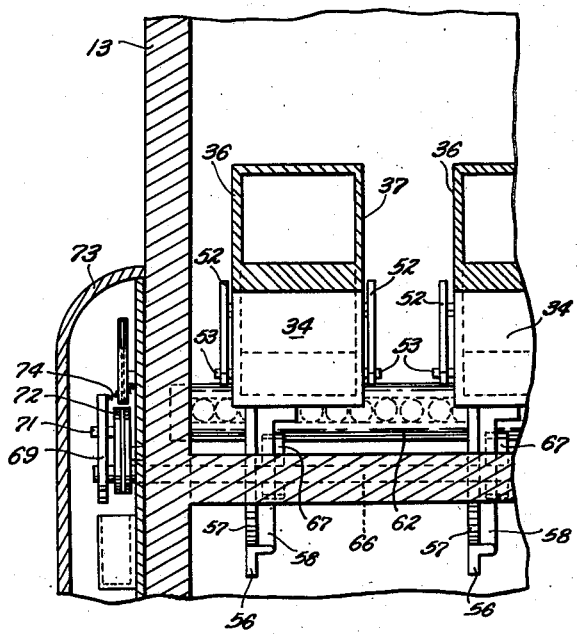
Fig. 5 is a section taken on line 5—5 of Fig. 3.

All the receptacles are normally secured in closed position, subject to release by actuation of a coin controlled mechanism, by a common locking rod 66 which is rockably mounted in the sides 13 and 14 of the cabinet and which carries fixed bars 67 each of which normally engage at its outer end against a shoulder 68 on the arm of its respective receptacle to preclude rotation of all the receptacles when the shaft is in locked, non-rotative condition. As clearly illustrated in Fig. 5 the lock rod 66 extends through the side wall 13 of the cabinet and has fixed to its outer end a lever 69 which has an elongate slot 70 in its outer end for receiving a pin 71 fixed to a rotatably mounted, coin controlled wheel 72. The lever 69, the coin controlled wheel 72 and their associated mechanism are disposed in a coin box 73 mounted on the side wall 13 of the cabinet, said lever being biased toward locked position by a spring 74 which is secured between the said lever and the wall 13. As this mechanism can readily be obtained on the market and does not form a material element of this invention it need not be described at length herein, it being understood however that upon deposit of a coin in the coin slot 75 the wheel 72 is freed for rotation thereby releasing the common lock shaft 66 so that a selected dispensing receptacle can be manually operated.

In operation a coin is inserted in the coin box which releases the lock rod 66 and releases all the dispensing receptacles for selective operation. Upon selection of the receptacle with the desired article therein its hand grip 30 is grasped and the receptacle moved from the closed position illustrated in Fig. 3, to the position illustrated in Fig. 4 so that the milk carton 45 in the pocket will be moved to the accessible dispensing position illustrated in Fig. 4, where it may be grasped and removed from said pocket. It will be noted that during said dispensing action the ball lock-out 62 functions to preclude simultaneous operation of a receptacle other than the one selected, and that the pawl 59 cooperates with the teeth on control bar 56 to preclude reversal of receptacle movement after initial actuation in either of its rotational directions. During the rotation of the dispensing receptacle the lower end of the feed chute is moved upwardly so that it assumes a substantially horizontal position, thereby relieving the chute feeding pressure on the article being dispensed and permitting the upper interior surface 76 of the wall 11 to act as a stop for articles in the chute during the dispensing operation. After withdrawal of the dispensed article from the receptacle the hand grip 30 is released and the receptacle is automatically returned to the inoperative position shown in Fig. 3 by the weight of the articles in the chute and the bias of spring 54, the suddenness of the stop serving to positively feed the lowermost carton into the empty receptacle and also precluding clogging of the chute by the tendency of the articles to wedge therein.

What is claimed is:

1. In a dispensing machine of the character described a closed cabinet, an upstanding front wall for the cabinet having a dispensing opening formed therethrough, a manually operable closure for the opening having its lower portion extending below the lower edge of said opening, a horizontal hinge connection between the cabinet wall and the lower edge of the closure, and L-shaped dispensing receptacle carried by the interior side of the closure and comprising an inclined end wall extending through the lower part of the dispensing opening from an intermediate portion of the closure, and a bottom wall fixed to the lower end of the end wall and oppositely inclined therefrom, said receptacle being bodily swingable in an arc by the closure between a normal article receiving position to an article dispensing position with the bottom wall disposed in and precluding access to the cabinet interior, an inclined feed chute mounted for rocking movement within the cabinet in longitudinal alignment with the receptacle and a longitudinally extensible connection between the adjacent portions of the receptacle bottom and the chute.

2. In a dispensing machine of the character described a closed cabinet, an upstanding front wall for the cabinet having a dispensing opening formed therethrough, a manually operable closure for the opening having its lower portion extending below the lower edge of said opening, a horizontal hinge connection between the cabinet wall and the lower edge of the closure, a handle portion extending above the upper end of the closure and spaced away from the front wall of the cabinet, an L-shaped dispensing receptacle carried by the interior side of the closure and comprising an inclined end wall extending through the lower part of the dispensing opening from an intermediate portion of the closure, and a bottom wall fixed to the lower end of the end wall and oppositely inclined therefrom, said receptacle being bodily swingable in an arc by the closure between a normal article receiving position to an article dispensing position with the bottom wall disposed in and precluding access to the cabinet interior, an inclined feed chute mounted for rocking movement within the cabinet in longitudinal alignment with the receptacle and a longitudinally extensible connection between the adjacent portions of the receptacle bottom and the chute.

3. In a dispensing machine of the character described a closed cabinet, an upstanding front wall for the cabinet having a dispensing opening formed therethrough, a manually operable closure for the opening having its lower portion extending below the lower edge of said opening, a horizontal hinge connection between the cabinet wall and the lower edge of the closure, an L-shaped dispensing receptacle carried by the interior side of the closure and comprising an inclined end wall extending through the lower part of the dispensing opening from an intermediate portion of the closure, and a bottom wall fixed to the lower end of the end wall and oppositely inclined therefrom, said receptacle being bodily swingable in an arc by the closure between a normal article receiving position to an article dispensing position with the bottom wall disposed in and precluding access to the cabinet interior, an inclined, channel shaped feed chute pivotally mounted intermediate its ends within the cabinet and having the lower edge of its bottom wall adjacent to and in alignment with the outer end of the receptacle bottom wall, a transverse pin extending laterally from beneath the outer end of the receptacle bottom wall, a longitudinally extended arm fixed to the lower end of the chute and resting upon the pin, and means for biasing the chute toward arm and pin engagement.

4. A vending machine having a closed cabinet, a plurality of inclined chutes mounted within the cabinet for rocking movement whereby rows of articles in said chutes are normally fed by gravity to the lower ends of said chutes, dispensing receptacles at the lower ends of said chutes for receiving the lower article in said chutes, means for pivotally mounting the receptacles on the cabinet to provide oscillating movements for the receptacles in and out of the cabinet around a common axis parallel to the lower ends of the chutes to move an article contained therein from the cabinet, an extensible connection between the chute ends and their respective receptacles, stop means on the cabinet for holding the row of articles from sliding down the chute when said receptacle is being moved out of the cabinet, and means for permitting oscillation of one of said receptacles at a time.

5. A vending machine having a closed cabinet, a front wall for the cabinet having a plurality of dispensing openings formed therethrough, a shaft mounted within the cabinet in substantial parallelism with the front wall, a plurality of inclined chutes each pivoted upon the shaft for independent rocking movement thereon whereby rows of articles in said chutes are normally fed by gravity to the lower ends of said chutes, dispensing receptacles pivotally mounted on the front wall for oscillating movement into and out of said openings, the said receptacles being normally disposed at the lower ends of said chutes for receiving the lowermost article therein, an extensible connection between the lower end of each chute and its respective receptacle, a stop means constituted by that portion of the front wall above the dispensing opening for holding the row of articles from sliding down the chute when the receptacle is being moved out of the cabinet, and means for permitting oscillation of one of said receptacles at a time.

6. A vending machine having a closed cabinet, a front wall for the cabinet provided with a plurality of dispensing openings, a horizontal mounting shaft disposed across the interior of the cabinet at the level of the upper ends of the openings, a plurality of side-by-side, inclined chutes mounted within the cabinet upon the shaft for rocking movements whereby rows of articles in said chutes are normally fed by gravity to the lower ends of said chutes normally located subjacent the lower edges of their respective openings, dispensing receptacles normally positioned at the level of the lower ends of said chutes for receiving the lowermost articles in said chutes, means for pivotally mounting the receptacles on the outer side of the cabinet wall to provide oscillating movements for the receptacles into and out of the cabinet around a common axis parallel to the mounting shaft to thereby move an article contained therein from the cabinet, extensible, chute supporting connections between the chute ends and the adjacent ends of their respective receptacles, means for permitting oscillation of one of said receptacles at a time, whereby the receptacle is moved upwardly and out through the opening and the lower end of the chute is moved adjacent to the interior portion of the cabinet wall above the opening to hold the row of articles therein from sliding down said chute.

7. A vending machine having a closed cabinet, a plurality of inclined chutes mounted within the cabinet for rocking movement whereby rows of articles in said chutes are normally fed by gravity to the lower ends of said chutes, dispensing receptacles at the lower ends of said chutes for receiving the lower article in said chutes, means for pivotally mounting the receptacles on the cabinet to provide oscillating movements for the receptacles into and out of the cabinet around a common axis parallel to the lower ends of the chutes to thereby move an article contained therein from the cabinet, extensible connections between the chute ends and their respective receptacles, a depending, arcuate arm fixed to each receptacle, a ball lockout means extending across the paths of all of said arcuate arms, a coin controlled locking rod pivotally mounted within the cabinet in parallelism with the ball lockout and normally disposed in the path of the arcuate arm.

8. A vending machine having a closed cabinet, a front wall for the cabinet having a horizontal row of dispensing openings formed therethrough, a plurality of inclined chutes mounted within the cabinet for rocking movements whereby rows of articles in said chutes are normally fed by gravity to the lower ends of said chutes, dispensing receptacles at the lower ends of said chutes, a closure for each opening hinged along its lower edge to the front wall, means for securing each receptacle to its respective closure whereby upon pivotal movement of the closure the receptacle is moved into and out of the cabinet through the opening, extensible, chute supporting connections between the chute ends and their respective receptacles, stop means on the cabinet for holding the row of articles from sliding down the chute when said receptacle is being moved out of the cabinet, and means for permitting oscillation of one of said receptacles at a time.

GEORGE M. HUHEEY.
WILLIAM J. WHITACRE.

REFERENCES CITED

The following references are of record in the file of this patent:

UNITED STATES PATENTS

| Number | Name | Date |
| --- | --- | --- |
| 1,619,006 | Vaughan | Mar. 1, 1927 |
| 1,715,498 | Gaston | June 4, 1929 |
| 1,773,329 | Upham | Aug. 19, 1930 |
| 1,861,834 | Binggeli | June 7, 1932 |